O. J. BOOS, HORACE BOOS & HENRY BOOS.
CONVEYER MECHANISM.
APPLICATION FILED DEC. 15, 1915.
1,270,001.
Patented June 18, 1918.
2 SHEETS—SHEET 1.
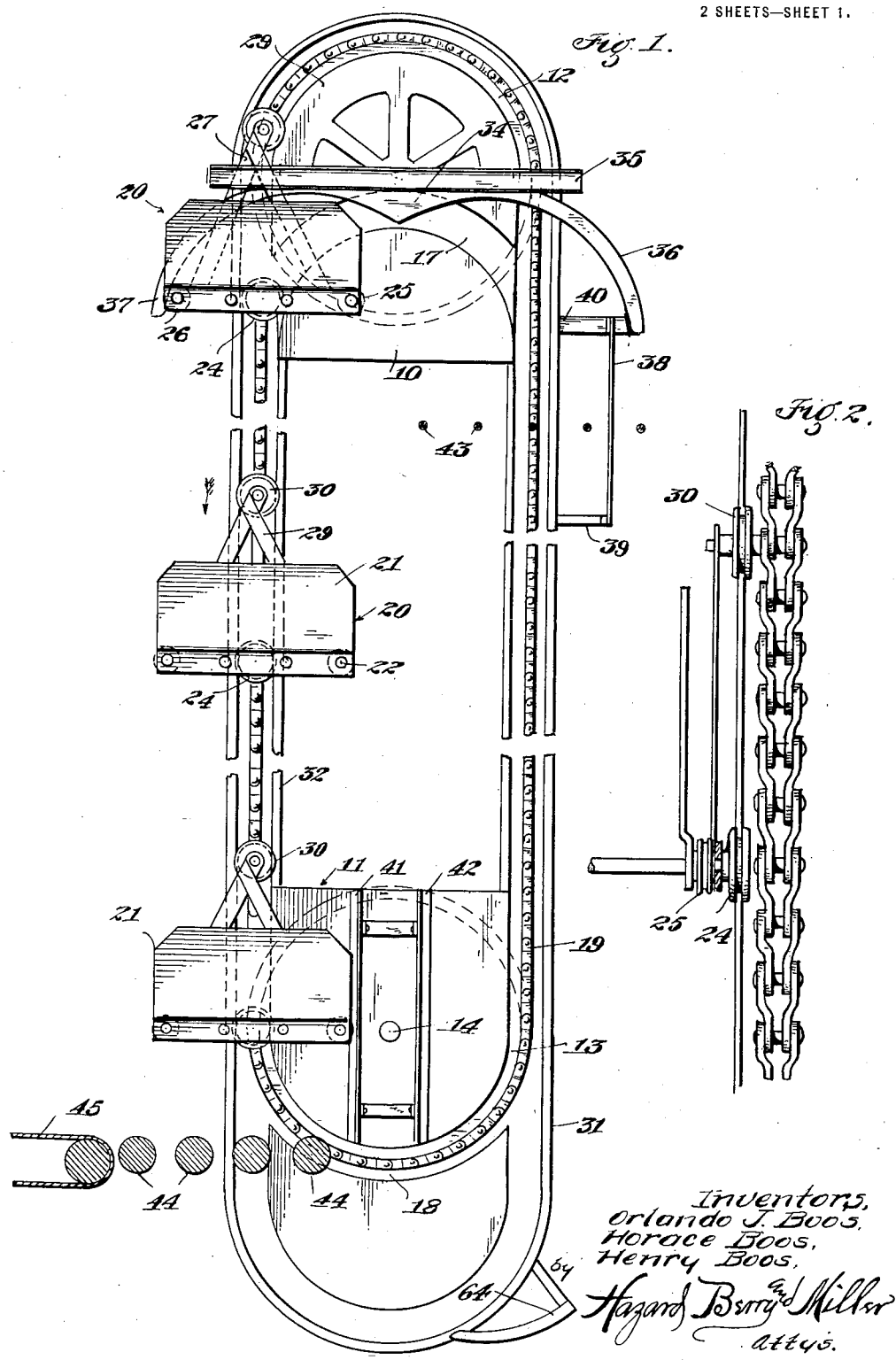
Inventors,
Orlando J. Boos,
Horace Boos,
Henry Boos,
Hazard Berry and Miller
attys.

O. J. BOOS, HORACE BOOS & HENRY BOOS.
CONVEYER MECHANISM.
APPLICATION FILED DEC. 15, 1915.
1,270,001.
Patented June 18, 1918.
2 SHEETS—SHEET 2.
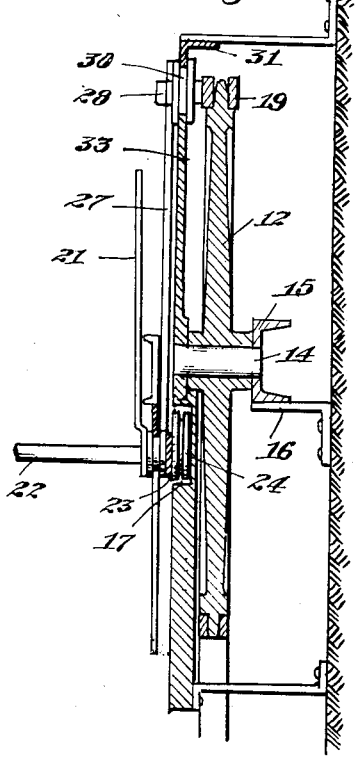
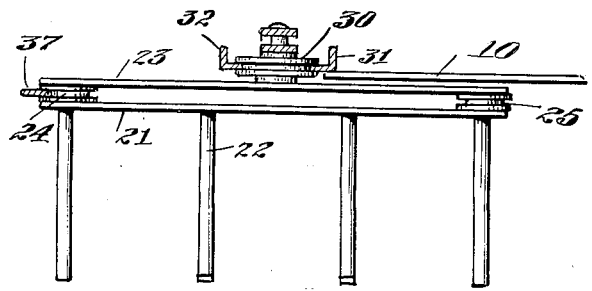
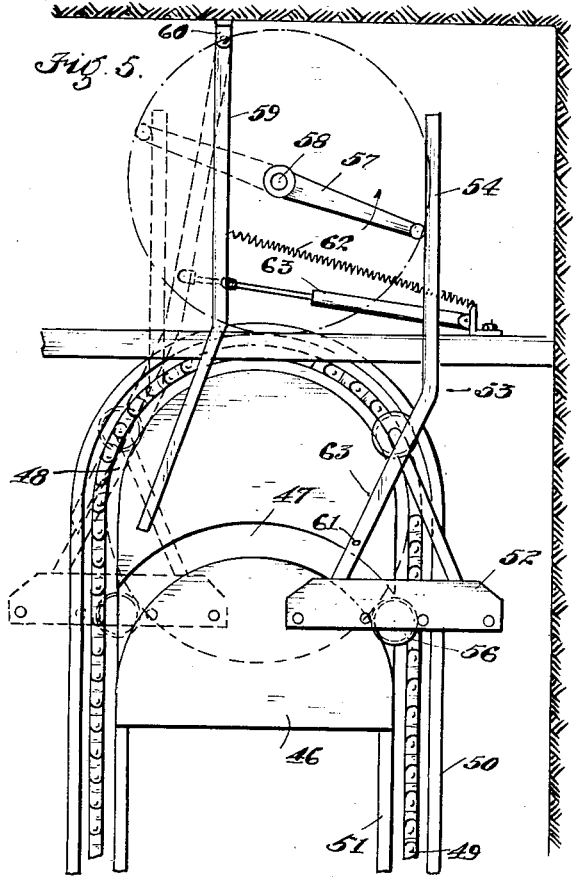
Inventors,
Orlando J. Boos.
Horace Boos.
Henry Boos.

UNITED STATES PATENT OFFICE.

ORLANDO J. BOOS, HORACE BOOS, AND HENRY BOOS, OF LOS ANGELES, CALIFORNIA.

CONVEYER MECHANISM.

1,270,001.  Specification of Letters Patent.  Patented June 18, 1918.

Application filed December 15, 1915. Serial No. 67,035.

*To all whom it may concern:*

Be it known that we, ORLANDO J. Boos, HORACE Boos, and HENRY Boos, citizens of the United States, residing at Los Angeles, in the county of Los Angeles and State of California, have invented new and useful Improvements in Conveyer Mechanism, of which the following is a specification.

This invention relates to a conveyer mechanism and more particularly to means for lifting trays of dishes from a stationary holder and lowering the trays on to a continuously movable horizontal conveyer.

Another object of the invention is to provide a conveyer mechanism especially adapted for use in cafés and cafeterias to elevate trays of clean dishes, tableware, etc., from one level to another and to pick up trays loaded with dirty dishes and tableware from an upper level and lower the same on to an endless horizontal conveyer.

The invention also aims to provide a positive means for preventing the carriers tilting as they pass from one vertical lead of the conveyer to the other such as occurs at the top of the mechanism.

A further object is to provide conveyer mechanism of this type which shall be of extremely simple construction, positive in its operation and which may be run continuously so as to be always working when needed.

With these and other objects in view, the invention consists in certain novel features of construction, combination and arrangement of parts as will be hereinafter fully described, illustrated and claimed.

In the drawings,

Figure 1 is a front elevation of our improved conveyer mechanism.

Fig. 2 is a fragmentary detail view partly in elevation and partly in section showing a portion of the endless sprocket chain with a carrier connected thereto.

Fig. 3 is a vertical sectional view taken centrally through the upper portion of the conveying mechanism and showing the large sprocket wheel, the block which supports the same, the sprocket chain, and a carrier supported thereon.

Fig. 4 is a horizontal sectional view showing a top plan view of one of the carriers, and Fig. 5 is a fragmentary front elevation showing the upper end of a slightly modified form of conveyer mechanism.

Briefly considered, our invention consists in a pair of vertically spaced sprocket wheels, an endless sprocket chain running around said sprocket wheels, dependent carriers attached to the sprocket chain to be raised and lowered by the movement thereof, and adapted to hang to extend horizontally, guide tracks for the carriers, and transfer means permitting the carriers to move, when they approach the turns of the conveyer, from one lead to the other without tilting.

Referring more specifically to the invention by numerals, 10 designates the upper block or plate and 11 the lower block or plate. These blocks are substantially rectangular in shape with their outer ends rounded and provide supports for the sprocket wheels 12 and 13. These wheels are preferably supported on stub axles or pivots 14 having their forward ends fixed in the plates 10 and 11 respectively and their rear ends secured in channel irons such as shown at 15 in Fig. 3. Any suitable means such as the bracket 16 may be employed as a support for the channel bars 15. The block 10 is formed with a transfer slot 17 opening upon its forward face, extending from one edge to the other and conforming in curvature to the circumference of the sprocket wheel 12. The block 11 is provided with a transverse slot 18 extending entirely across the block and through the same and this slot 18 is of a curvature to conform to its sprocket wheel 13.

A sprocket chain or conveyer chain 19 runs around the sprocket wheels 12 and 13 for the purpose of raising and lowering a plurality of carriers 20.

Each carrier comprises a rear wall or plate 21 disposed in a vertical plane and having connected adjacent its lower edge a plurality of rods or fingers 22 which extend at substantially right angles to the plate 21 and which are for the purpose of supporting the articles to be conveyed. A secondary plate or strip 23 extends longitudinally of the plate 21 adjacent its lower edge in spaced relation thereto and between these plates are journaled the wheels or rollers 24, 25 and 26, all of which latter are grooved for a purpose to be hereinafter set forth. A hanger 27 connects the carrier 20 to a stud 28 fixed to the sprocket chain 19. An arm 29 connects with the carrier and hanger 27 as best shown in Fig. 1 and serves as a support or reinforcing member. The hanger 27 is loose on the stud 28 so that as the stud moves around the sprocket wheels with the sprocket chain the force of gravity will tend to hold the carrier in a dependent position with the fingers 22 in the substantially horizontal plane.

A grooved wheel or roller 30 is journaled on the stud 28 and is continuously engaged with an endless track or guide 31 which, as shown in Fig. 1, completely encircles the blocks 10 and 11, lies in the same plane therewith, and consists of two parallel side portions connected by curved end portions. To check the inward movement of the wheels 30 a pair of tracks or guides 32 are provided which extend between the blocks 10 and 11 and which are disposed parallel to the side portions of the outer track 31 in the proper spaced relation to accommodate said wheels. The outer end portions of the blocks 10 and 11 are of a reduced thickness as indicated at 33 in Fig. 3 and the peripheries of said reduced portions serve as tracks for the wheels 30 and 31, respectively, as they pass around the ends of the blocks.

As this machine is primarily intended for the conveyance of trays loaded with dishes and glassware, it is essential that the carriers be prevented from tilting which would allow the trays to slide off, and to accomplish this at the upper end of the conveyer, we provide a deflector 34 secured to a dependent channel bar 35 and formed with a pair of downwardly curved deflector arms 36 and 37 which lie in a plane parallel to the plane of the block 11 and spaced a slight distance in front thereof. The inner ends of the arms 36 and 37 meet at the center of the conveyer and their outer ends project into the path of the rollers 25 and 26 so as to catch the outer roller as the carrier moves upwardly and force it to move toward the longitudinal center of the machine which movement will cause the wheel 24 of the carrier to ride into the transfer slot 17. As the sprocket chain 19 carries the roller 30 around the top of the block 10, the roller 24 will move through the slot 17 and be guided and steadied thereby so that there will be no possibility of the carrier tilting so as to spill its load.

To further steady the carrier as its starts through the slot 17 and to insure the roller 24 properly engaging in the slot 17 we provide a vertical pressure bar 38 held by the arms 39 and 40. This bar engages with the secondary strip 23 of the carrier as the carrier approaches the block 10 and prevents any lateral swing of the former.

The lower block 11 carries a pair of vertical tracks 41 and 42 which are engaged by the inner end roller of the carrier as the roller 24 approaches and leaves the slot 18, thus steadying the carrier as it is transferred from one lead to the other of the conveyer chain at the bottom of the device.

Trays to be picked up by a carrier are placed upon the stationary tray holding rods or fingers 43 and a tray so placed will remain stationary until engaged by the fingers of a carrier as it moves upwardly between the rods 43. The carrier in its upward movement engages the tray and moves on upwardly and is transferred to the downwardly moving lead of the conveyer chain by the slot 17 as heretofore described, and finally deposits the tray with its load upon the rollers 44 which are moved to feed the tray on to the belt conveyer 45. The carrier then continues its journey and is ready to pick up another tray when it reaches the tray holders 43. It will be noted that throughout the entire course of a carrier there is no possibility of its tilting for the tracks 31 and 32 hold it steady except at such times as it is passing across the blocks 10 and 11, and at these times it is adequately steadied by means of the deflector 34 and the tracks 41 and 42.

In Fig. 5 we have shown a modified form of conveyer mechanism wherein an end plate 46 having a transfer slot 47 and supporting a sprocket wheel 48 is provided. This plate, the sprocket wheel, the sprocket chain 49 and the tracks 50 and 51 are similar in construction to corresponding parts previously described and therefore will not be again mentioned in detail.

The carriers 52 are each provided with a long angular arm 53 having a vertical portion 54 which projects a considerable distance above the top of the conveyer chain as the carrier is transferred from one lead to the other at the top of the machine. When pressure is brought to bear against the inner edge of the arm 54 it will tend to tilt the carrier 52 slightly to insure the roller 56 of the carrier riding into the slot 47.

The means provided to engage the arm 54 at the proper moment comprises a tilting crank 57 pivoted at 58 and driven, by means not shown, to press against the arm 54 and throw the roller 56 into the slot 47. The crank 57 then swings upwardly away from the arm 54 and continues to move in a circle so as to be ready to engage the tilting arm of the next carrier as it approaches the slot 47. To hold the carrier steady as it passes from the slot 47, we provide a pivoted arm 59 which swings from a pivot 60 and which engages a pin 61 carried by the arm 54, in forcing the pin inwardly and downwardly to hold the roller 56 against the bottom face of the slot 47. The pivoted arm 59 is returned into its normal position by a contractile spring 62 and to prevent a sudden return we provide a dash-pot 63.

As a means for preventing oscillation of the carrier 20 on its passing around its lower turn, a segmental guard 64 is provided as particularly shown in Fig. 1, which serves to engage the roller 25 to steady the carrier at this point.

While we have shown and described the preferred embodiments of our invention it will be understood that minor changes in construction and arrangement of parts may be made without deviating from the scope and spirit of the invention as claimed.

What we claim is:

1. In a conveyer, an endless conveyer chain, a sprocket wheel over which said chain passes, a carrier pivotally suspended from one of the links of the chain, and means to steady the carrier as it passes from one lead of the chain to the other, said means comprising a body having a slot formed therein, a roller mounted on the carrier to ride through said slot, and a deflector to force the roller into the slot.

2. In a conveyer, an endless sprocket chain, a sprocket wheel over which said chain passes, a block formed with an arcuate slot extending entirely across one face thereof, a carrier pivotally suspended from one of the links of the chain, a wheel mounted on the carrier to ride through said slot whereby the carriage will be maintained in a vertical position, a deflector having a pair of curved deflector arms, and a second wheel mounted on the carrier to be engaged by one of said deflector arms whereby the first-mentioned wheel is induced into the arcuate slot, and means for alining said wheels horizontally prior to their passage into engagement with said arm and said slot.

3. A conveyer mechanism comprising an endless conveyer chain, carriers suspended from said chain and depending with respect thereto, guideways for the said carriers, the straight portions thereof being coincident with the direction of the chain, while the curved portions of the guideway falls below the path of the chain, guide rollers on the lower portions of the carriers adapted to travel in said guideways, auxiliary guide rollers at the outer lower corners of the carriers, a curved guide bar opposite the upper bend of the guideways and adapted to engage one of the auxiliary rollers for carrying the guide roller of the carrier into the curved portion of the guideways, a second guide bar forming a continuation of the first and adapted to engage the other auxiliary guide roller, the said guide bars coöperating with the point of connection between the carrier and the conveyer chain for holding the same with a three point engagement in vertical position and passing the bend at the upper end of the mechanism.

In testimony whereof we have signed our names to this specification.

ORLANDO J. BOOS.
HORACE BOOS.
HENRY BOOS.